Sept. 30, 1969 D. R. McLELLAN 3,469,652

ACOUSTIC RESONATOR WITH GAS RECIRCULATION TUBES

Filed June 17, 1968 2 Sheets-Sheet 1

INVENTOR.
David R. McLellan
BY
E. J. Biskup
ATTORNEY

INVENTOR.
David R. McLellan
BY
E. J. Biskup
ATTORNEY

United States Patent Office 3,469,652
Patented Sept. 30, 1969

3,469,652

ACOUSTIC RESONATOR WITH GAS RECIRCULATION TUBES

David R. McLellan, Pontiac, Mich., assignor to General Motors Corporation, Detroit, Mich., a corporation of Delaware Filed June 17, 1968, Ser. No. 737,744
Int. Cl. F01n *1/08*
U.S. Cl. 181—44 4 Claims

ABSTRACT OF THE DISCLOSURE

A resonator of the type having a chamber tuned to attenuate low frequency sound waves in a motor vehicle exhaust system characterized by a tuning chamber being acoustically coupled in parallel by a pair of tuning tubes having inlets fluidly and acoustically communicating with opposite ends of the resonator conductor duct. A restricted channel in the conductor duct produces a pressure drop between the inlets that induces a flow of heated exhaust gases through the tuning tubes and in the tuning chamber that raises the temperature of the resonator above a range wherein exhaust gases corrosively react with the interior surface of the resonator shell.

Resonators having tuned resonator chambers are commonly used to attenuate objectionable low frequency sound waves in the tail pipe section of motor vehicle exhaust systems. The resonators utilize an enclosed volume of air, which is called a tuning or resonator chamber and a duct, commonly called a tuning tube, which has one end registering with the resonator conductor duct and the other end registering with the tuning chamber. The column of air in the tuning tube and the volume of air in the tuning chamber comprise a simple spring-mass system that can be designed according to well-known principles to have a calculated tuned resonant frequency. For motor vehicle exhaust system applications, the resonant frequency is usually selected to attenuate an objectionable low frequency in the 20 to 200 c.p.s. range.

Previous resonator designs have utilized a dead-mass system wherein there is essentially no gas flow in the tuning tube and the tuning chamber. Accordingly, the surface temperature of the encircling resonator shell is considerably lower than that of the resonator conductor duct and the tail pipe. It is known that exhaust gas condensate is deposited on the resonator shell and corrosively reacts therewith when the interior surface temperature is within a region known as the critical corrosion range. For conventional internal combustion engines, the critical corrosion range is between 110° F. and 150° F. and is primarily dependent on the composition, volatility and reactivity of the exhaust gas condensate. Below the lower limit, the corrosive reaction is gradual and, consequently, the corrosion problem is not considered to be significant. Above the upper limit, the condensate is vaporized upon contact with the interior surfaces before a corrosive reaction can occur. However, within the critical corrosion range, the corrosive reaction is accelerated thereby shortening the useful life of the resonator. Although the corrosion problem can be somewhat alleviated by using materials less susceptible to corrosive reaction between these temperatures, more expensive materials are required and the overall cost of the resonator is increased.

The present invention overcomes the above-mentioned problem by maintaining a constant gas flow throughout the resonator so as to raise the surface temperature of the resonator shell above the aforementioned critical corrosion range. Consequently, the problems of corrosion are minimized. This secondary gas flow is achieved by forming a restricted channel in the resonator conductor duct that produces a pressure drop between the upstream and downstream ends thereof. A pair of tuning tubes are acoustically coupled in parallel with a tuning chamber and have respective inlets fluidly and acoustically communicating with the conductor duct at opposite ends of the restricted channel. The pressure drop induces a continuous flow of hot exhaust gases through the tuning tubes and in the tuning chamber sufficient to raise the surface temperature of the resonator shell and interior resonator components above the critical corrosion range. In the preferred form, the resonator shell is insulated to minimize the heat loss therethrough and maintain the temperature of the interior surfaces of the resonator above the critical corrosion range for all modes of engine operation. The continuous flow of hot exhaust gases throughout the resonator is also used to purge the latter of any condensate that may have accumulated during periods when the engine is not running and thereby eliminate a secondary cause of corrosion.

Accordingly, the objects of the present invention are: to provide a resonator of the type having a tuning tube and a tuning chamber wherein means are provided for inducing a continuous flow of exhaust gases throughout the resonator; to provide a resonator wherein a continuous flow of exhaust gases throughout the resonator is used to purge the resonator of condensate and raise the surface temperature of the interior components above the critical corrosion range of the exhaust gases; to provide a resonator wherein a restricted channel formed in the resonator conductor duct produces a pressure drop that induces a continuous gas flow through the inlets of a pair of tuning tubes acoustically coupled to a tuning chamber, the gas flow being sufficient to raise the surface temperature of the interior resonator components above the critical corrosion range of the exhaust gases; and to provide a resonator wherein a pair of tuning tubes in the resonator shell are acoustically coupled in parallel and have inlets acoustically and fluidly communicating with a tuning chamber and wherein a restricted channel formed in the resonator conductor duct produces pressure differential between the inlets that induces a continuous flow of gas through the tuning tubes and in the tuning chamber thereby raising the temperature of the interior resonator components above the critical corrosion range of the exhaust gases.

These and other objects will be apparent to one skilled in the art upon reading the following detailed description, reference being made to the accompanying drawings in which.

Figure 1:
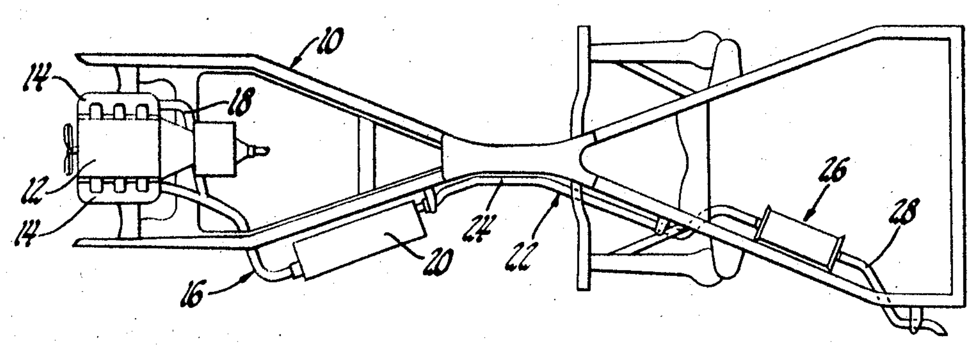
FIGURE 1 is a bottom view of a motor vehicle exhaust system incorporating a resonator assembly made in accordance with the present invention.

FIGURE 1 illustrates a motor vehicle frame 10 on which there is mounted an internal combustion engine 12 having exhaust manifolds 14. For the V-type engine illustrated, exhaust gases are discharged from the exhaust manifolds 14 to an exhaust pipe 16 which includes a cross-over pipe 18. The exhaust pipe 16 is connected to a conventional muffler 20 which, in turn, is connected to a tail pipe, generally indicated by reference numeral 22, that extends to the rear of the vehicle frame 10. The tail pipe 22 includes a front conduit 24, a resonator 26 and a tail pipe extension 28. Those skilled in the art will appreciate that the above-mentioned components, from the manifolds 14 to the tail pipe extension 28, form an exhaust line through which hot exhaust gases flow from the engine 12 and exhaust to the atmosplhere through the outlet of the tail pipe extension 28.

The tail pipe 22 has an acoustical length and, in turn, a resonating frequency determined by the dimensions of the above-mentioned parts and the properties, such as temperature, of the exhaust gases flowing therethrough. The engine 12 generates sound waves in the exhaust line having a frequency, commonly known as firing frequency, that is a function of the engine speed and the number of combustion cylinders. Where the firing frequency and the resonating frequency of the tail pipe 22 coincide, the amplitude of the waveform is at its maximum and it is this frequency, usually below 200 c.p.s., that the resonator 26 of the present invention is designed to attenuate.

Figure 2:
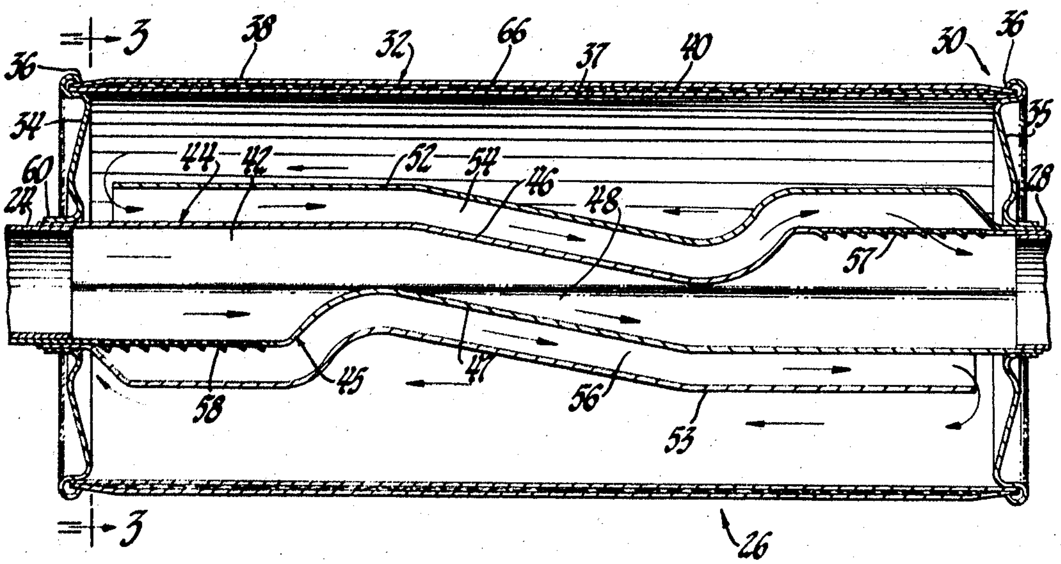
FIGURE 2 is an enlarged side cross-sectional view of the resonator assembly shown in FIGURE 1.

As shown more clearly in FIGURE 2, the resonator 26 comprises a resonator shell 30 having an axially extending casing 32, generally elliptical in cross section, to which end plates 34 and 35 are sealingly secured by a crimped peripheral joint 36. The casing 32 comprises an inner sleeve 37 and an outer sleeve 38 separated by an insulating layer 40. This insulated construction is used to reduce the heat loss through the casing 32 thereby raising the operating temperature within the resonator 26 for a given road speed of the motor vehicle.

Figure 3:
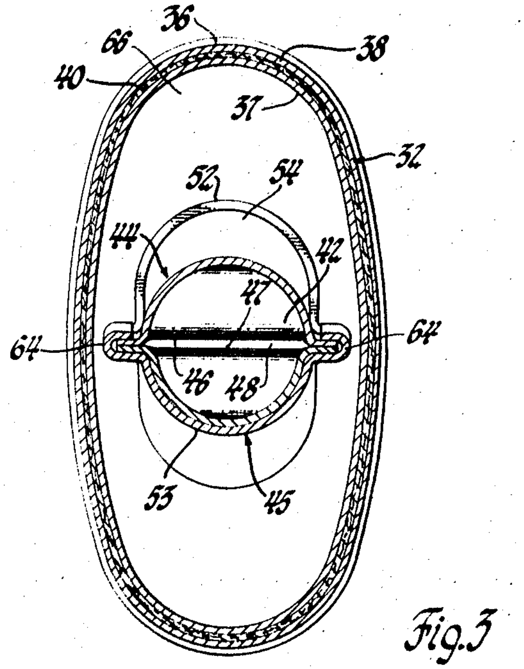
FIGURE 3 is an enlarged view taken along line 3—3 of FIGURE 2.

Located interiorly of the resonator shell 30 is a resonator conductor duct 42 through which heated exhaust gases flow from the conduit 24 to the tail pipe extension 28. As seen in FIGURES 2 and 3, the flow area of the conductor duct 42 is defined by a pair of reversely symmetrically formed conductor sections 44 and 45. The upstream and downstream end portions of each of the conductor sections 44 and 45 are generally semi-circular in cross section and are separated by intermediate sections 46 and 47 of reduced concavity, respectively, so that when the sections are joined together along their longitudinal lengths, a restricted channel 48 of reduced flow area is thereby established. As exhaust gases flow through the conductor duct 42, the restricted channel 48 produces a pressure drop that is a function of the exhaust gas velocity.

A pair of tube sections 52 and 53 overlie the conductor sections 44 and 45 in parallel spaced relationship and define therebetween a pair of coaxially aligned tuning tubes 54 and 56, respectively. An end portion of each of the tube sections 52 and 53 is sealingly secured to the conductor sections 44 and 45 to axially close the tuning tubes 54 and 56 adjacent the end plates 35 and 34, respectively. Each of the tuning tubes 54 and 56 are in fluid and acoustical communication with the conductor duct 42 by means of louvered inlets 57 and 58 formed in the conductor sections 44 and 45 on opposite sides of the retricted channel 48.

As shown more clearly in FIGURE 3, the upstream end portions of the conductor sections 44 and 45 and the tube section 53 define an annular inlet that is telescopically received within an axially extending annular sleeve 60 formed in the end plate 34. The end of the conduit 24, as shown in FIGURE 2, is sealingly received within the annular inlet to connect the upstream end of the resonator 26 in assembly. A similar connection at the downstream end is formed by the correspondingly shaped end portions of the end plate 35, the conductor sections 44 and 45 and the tube section 52. Referring to FIGURE 3, the conductor sections 44 and 45 and tube section 52 include longitudinally extending, outwardly turned flanges that are sealingly clamped together by a reversely bent portion 64 of the tube section 53.

The volume within the resonator shell 30 between the tube sections 52 and 53 and the casing 32 represents a tuning chamber 66 that is acoustically coupled in parallel with the tuning tubes 54 and 56. The resonating frequency of the assembly is a function of the volume of the tuning chamber 66 and the conductivity of the tuning tubes 54 and 56 and, by well-known methods, these components can be designed to resonate at a calculated tuned frequency. In the preferred embodiment, the resonator 26 is tuned to a frequency wherein the engine firing frequency coincides with the natural resonating frequency of the tail pipe 22. At this frequency, the sound wave generated by the exhaust gases will have nodal and antinodal pressure points dependent on the acoustical length of the tail pipe 22. Preferably, the resonator 26 is located at a pressure antinode at the calculated tuned frequency. To achieve greater attenuation bandwidth, the louvered inlets 57 and 58 to the tuning tubes 54 and 56, respectively, are separated by only a small fraction of a wavelength of sound at the calculated tuned frequency.

In operation, as the exhaust gases flow through the exhaust line and enter the resonator conductor duct 42, a pressure drop is produced between the upstream and downstream sides of the restricted channel 48. This pressure drop induces a flow of gas as indicated by the arrows wherein the exhaust gases enter through the inlet 58, pass through the tuning tube 56, circulate within the tuning chamber 66, and exit via the tuning tube 54 through the inlet 57 downstream of the restricted channel 48. As previously mentioned, one of the primary objects of the present invention is to use the exhaust gases to raise the surface temperature of the interior resonator components above the range wherein a corrosive reaction occurs between condensate in the exhaust gases and the materials used in the resonator construction. This range, commonly called the critical corrosion range, is a function of the composition, reactivity and volatility of the exhaust gas condensate and for the products of combustion in conventional internal combustion engine exhaust systems ranges between 110° F. and 150° F.

Figure 4:
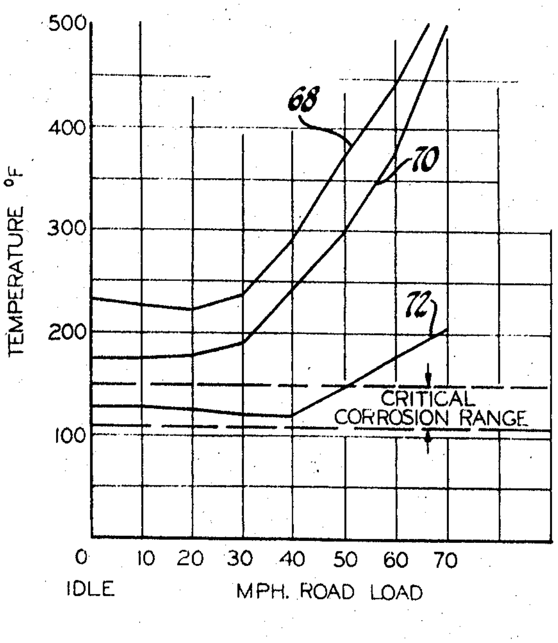
FIGURE 4 is a graph relating the temperature of the exhaust system components to motor vehicle road speed.

Referring to FIGURE 4, the temperature of the resonator 26, the tail pipe 22 and a conventional resonator are related to the aforementioned critical corrosion range for various road speeds in a test vehicle. In the graph, the upper line 68 represents the temperature within the front conduit 24 adjacent the upstream end of the resonator 26; the intermediate line 70 represents the temperature within the tuning chamber 66; and the lower line 72 represents the temperature within the encircling shell of a conventional resonator.

In the construction used for the test illustrated in FIGURE 4, the restricted channel 48 was sized to produce a pressure drop that routed approximately one-half of the exhaust gases through the tuning chamber 66. With this construction, it will be noted that the resonator temperature 70 has a relatively constant gradient with respect to the tail pipe temperature 68 for all road speeds. Whereas the conventional resonator temperature 72 is within the critical corrosion range until the higher road speeds, the temperature of the subject resonator, on the other hand is consistently thereabove even at the lower road speeds. Consequently, those skilled in the art will readily recognize that operation in this range will significantly increase the useful life of a resonator.

Whereas previous resonators have used a stainless steel construction to partially eliminate the aforementioned corrosive reaction, it has been found that the above-described secondary flow of exhaust gases will permit the use of a less expensive aluminized steel construction. Additionally, it should be noted that the secondary flow of hot exhaust gases will purge the resonator of any condensate that might have been collected therewithin during periods when the engine is not running. This feature, in turn, will eliminate the problems of condensate corrosion.

Although only one form of this invention has been shown and described, other forms will be readily apparent to those skilled in the art.

I claim:

1. A resonator for attenuating sound waves in a conduit through which gases flow, comprising: a conductor duct having end portions adapted to be fluidly and acoustically connected to said conduit; a shell encircling said conductor duct and sealingly secured to said end portions, said shell and said conductor defining a tuning chamber therebetween; first and second tuning tubes in the shell acoustically coupled in parallel with said tuning chamber and having respective inlets fluidly and acoustically communicating with said conductor duct adjacent said end portions; and a restriction formed in the conductor duct producing a pressure differential between said inlets as gas flows through said conductor duct, said pressure differential inducing a secondary gas flow between the inlets through the tuning tubes and within said tuning chamber.

2. A resonator for attenuating sound waves in a conduit through which heated gases flow, said gases corrosively reacting with said resonator when the interior surface temperature thereof is within a critical corrosion range in the order of 110° F. and 150° F., comprising: a conductor duct having end portions adapted to be fluidly and acoustically connected to said conduit; a shell encircling said conductor duct and sealingly secured to said end portions, said shell and said conductor defining a tuning chamber therebetween; first and second tuning tubes in the shell acoustically coupled in parallel with said tuning chamber and having respective inlets fluidly and acoustically communicating with said conductor duct adjacent said end portions; and a restriction formed in the conductor duct producing a pressure differential between said inlets as gas flows through said conductor duct, said pressure differential inducing a secondary gas flow between the inlets through the tuning tubes and within said tuning chamber whereby the interior temperature of said resonator is raised above said critical corrosion range.

3. A resonator for attenuating sound waves at a tuned frequency between 20 and 200 c.p.s. in a tail pipe of a motor vehicle exhaust line through which heated exhaust gases flow, said exhaust gases corrosively reacting with said resonator when the surface temperature thereof is within a critical corrosion range between 110° F. and 150° F., said resonator comprising: a conductor duct having end portions adapted to be fluidly and acoustically connected to said tail pipe; a shell encircling said conductor duct and defining a tuning chamber therebetween; first and second tuning tubes in the shell acoustically coupled in parallel with said tuning chamber and having respective louvered inlets fluidly and acoustically communicating with said conductor duct adjacent said end sections, said tuning chamber and tuning tubes acoustically tuned to attenuate sound waves at said tuned frequency; and a restriction formed in said conductor duct intermediate said louvered inlets producing a pressure differential between said end portions as exhaust gases flow through said conductor duct, said pressure differential inducing a secondary exhaust gas flow between the inlets through the tuning tubes and within said tuning chamber of sufficient magnitude to raise the interior surface temperature of the shell above said critical corrosion range.

4. A resonator for attenuating sound waves at a tuned frequency between 20 and 200 c.p.s. in a tail pipe of a motor vehicle exhaust line having heated exhaust gases flowing therethrough which corrosively react with said resonator when the surface temperature thereof is within a critical corrosion range in the order of 110° F. to 150° F., said resonator comprising: a conductor duct having end portions adapted to be fluidly and acoustically connected to said tail pipe; a restriction formed in said conductor duct intermediate said end portions, said restriction producing a pressure differential between end portions as exhaust gases flow through said conductor duct; a shell including insulating material for minimizing heat loss therethrough under operating conditions encircling said conductor duct and sealingly secured to said end portions, said shell and said conductor defining a tuning chamber therebetween; first and second tuning tubes in the shell having respective louvered inlets spaced a small fraction of a wavelength apart at said tuned frequency, said tuning tubes fluidly and acoustically communicating with said conductor duct on opposite sides of said restriction and acoustically coupled with said tuning chamber to attenuate sound waves at said frequency, said pressure differential inducing a secondary gas flow between the inlets through the tuning tubes and within said tuning chamber thereby raising the interior surface temperature of the shell above said critical corrosion range.

References Cited

UNITED STATES PATENTS

| | | | |
|---|---|---|---|
| 2,095,999 | 10/1937 | Miles | 181—44 XR |
| 2,625,234 | 1/1953 | Fina | 181—46 XR |

FOREIGN PATENTS

| | | |
|---|---|---|
| 557,311 | 8/1932 | Germany. |

ROBERT S. WARD, Jr., Primary Examiner

U.S. Cl. X.R.

181—54, 59